United States Patent
Kwon et al.

(10) Patent No.: US 12,229,539 B2
(45) Date of Patent: Feb. 18, 2025

(54) APPLICATION OPTIMIZATION METHOD AND APPARATUS SUPPORTING THE SAME

(71) Applicant: SAMSUNG ELECTRONICS CO., LTD., Suwon-si (KR)

(72) Inventors: Byungsoo Kwon, Suwon-si (KR); Kiljae Kim, Suwon-si (KR); Daehyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 81 days.

(21) Appl. No.: 17/848,090

(22) Filed: Jun. 23, 2022

(65) Prior Publication Data

US 2023/0030132 A1    Feb. 2, 2023

Related U.S. Application Data (63) Continuation of application No. PCT/KR2022/007668, filed on May 30, 2022.

(30) Foreign Application Priority Data

Aug. 2, 2021   (KR) .......................... 10-2021-0101346

(51) Int. Cl.
*G06F 8/41*    (2018.01)
(52) U.S. Cl.
CPC ................... *G06F 8/443* (2013.01)
(58) Field of Classification Search
CPC ............... G06F 8/443; Y02D 10/00
See application file for complete search history.

(56) References Cited

U.S. PATENT DOCUMENTS

| | | | | |
|---|---|---|---|---|
| 5,966,539 A | * | 10/1999 | Srivastava | G06F 8/4435 717/160 |
| 9,489,180 B1 | * | 11/2016 | Baskaran | G06F 8/443 |
| 11,836,507 B2 | * | 12/2023 | Iyer | G06F 9/5016 |
| 2005/0231516 A1 | * | 10/2005 | Zimmer | G06F 9/45504 345/531 |

(Continued)

FOREIGN PATENT DOCUMENTS

| | | |
|---|---|---|
| CN | 108008958 | 5/2018 |
| CN | 108614697 | 10/2018 |

(Continued)

OTHER PUBLICATIONS

Search Report and Written Opinion issued Aug. 23, 2022 in counterpart International Patent Application No. PCT/KR2022/007668 and English translation.

*Primary Examiner* — Daxin Wu
(74) *Attorney, Agent, or Firm* — NIXON & VANDERHYE P.C.

(57) ABSTRACT

Provided is an application optimization method and an electronic device supporting the same. According to an example embodiment, the application optimization method may include: determining whether a condition set with respect to a duration of an idle state of the electronic device is satisfied, selecting an application for which application optimization is to be performed based on an application usage record of a user of the electronic device in response to the set condition being satisfied, and generating an optimized application by performing the application optimization in the background for the selected application.

20 Claims, 6 Drawing Sheets

(56) References Cited

U.S. PATENT DOCUMENTS

| | | | | |
|---|---|---|---|---|
| 2010/0174928 | A1* | 7/2010 | Borghetti | G06F 1/3203 |
| | | | | 713/320 |
| 2015/0324177 | A1* | 11/2015 | Kawahito | G06F 8/443 |
| | | | | 717/155 |
| 2016/0259667 | A1* | 9/2016 | Bailey | G06F 9/4893 |
| 2019/0138325 | A1* | 5/2019 | Chen | G06N 7/00 |
| 2020/0142736 | A1* | 5/2020 | Marmignon | G06F 9/4881 |
| 2020/0183670 | A1* | 6/2020 | Kumar | G06F 8/425 |
| 2020/0310768 | A1* | 10/2020 | Zhang | G06F 8/43 |
| 2021/0064401 | A1* | 3/2021 | Vichare | G06F 9/44505 |
| 2023/0127112 | A1* | 4/2023 | Tsirkin | G06F 9/4831 |
| | | | | 718/103 |

FOREIGN PATENT DOCUMENTS

| | | | | |
|---|---|---|---|---|
| CN | 111930410 | | 11/2020 | |
| CN | 112463350 | | 3/2021 | |
| CN | 108536488 B | * | 12/2021 | ......... G06F 9/44505 |
| KR | 10-1999-0036882 | | 4/1999 | |
| KR | 10-1100439 | | 12/2011 | |
| KR | 10-2016-0150100 | | 12/2016 | |
| KR | 10-2165928 | | 10/2020 | |
| KR | 10-2021-0046426 | | 4/2021 | |

* cited by examiner

| compile-filter | Description |
|---|---|
| verify | Only perform dex code verification |
| quicken | Perform dex code verification and optimize portion of dex instruction |
| speed-profile | Perform dex code verification and AOT-compile method in profile |
| speed | Perform dex code verification and AOT-compile all methods in profile |

APPLICATION OPTIMIZATION METHOD AND APPARATUS SUPPORTING THE SAME

CROSS-REFERENCE TO RELATED APPLICATIONS

This application is a continuation of International Application No. PCT/KR2022/007668 designating the United States, filed on May 30, 2022, at the Korean Intellectual Property Receiving Office and claiming priority to Korean Patent Application No. 10-2021-0101346, filed on Aug. 2, 2021, at the Korean Intellectual Property Office, the disclosures of which are incorporated by reference herein in their entireties.

BACKGROUND

1. Field

The disclosure relates to an application optimization technique.

2. Description of Related Art

Due to development of computing systems, many application programs (hereinafter, applications) that operate in an electronic device, such as a smart phone, are being produced. Such applications may be configured as a plurality of code for achieving a predetermined purpose, and may be packaged and distributed. When an application is installed in an electronic device, the code written in a programming language may be converted into code for a platform supported by the electronic device, and the converted code may be used as a set of instructions to achieve the predetermined purpose. For example, in an electronic device to which an Android operating system is applied, the code of the application may be compiled to fit a runtime environment and converted into native code. As a compiling scheme for code, an ahead-of-time (AOT) scheme, a just-in-time (JIT) scheme, or a hybrid scheme in which the AOT scheme and the JIT scheme are mixed may be used.

When firmware is updated through an over-the-air (OTA) scheme or a setting value is initialized through a factory reset, a compiler filter of the application may be set to a predetermined value, and overall performance of the application including execution of the application may decrease. In addition, in a hybrid scheme, since the code of the application can be compiled when a predetermined condition (e.g., a charged state, an idle state, or a state in which a designated time, such as once a day, has arrived) is satisfied, there is no choice but to wait until the predetermined condition is satisfied in order to improve the performance of the application.

SUMMARY

Embodiments of the disclosure may provide a method and an apparatus supporting the method of performing optimization in application units by selecting an application to be optimized based on an application usage pattern of a user and compiling code.

According to an example embodiment, an application optimization method may include: determining whether a condition set with respect to a duration of an idle state of an electronic device is satisfied, selecting an application for which application optimization is to be performed based on an application usage record of a user of the electronic device in response to the set condition being satisfied, and generating an optimized application by performing the application optimization in the background for the selected application.

According to an example embodiment, an electronic device configured to support an application optimization method may include: at least one processor, and at least one memory configured to store instructions and an application to be executed by the processor, wherein when the instructions configured to be executed by the processor, the processor may be configured to: determine whether a condition set with respect to a duration of an idle state of the electronic device is satisfied, select an application to perform application optimization based on an application usage record of a user of the electronic device in response to the set condition being satisfied, and generate an optimized application by performing the application optimization in the background for the selected application.

According to various example embodiments of the disclosure, by optimization in application units being performed, application optimization may be performed even if an idle time of an electronic device is short.

According to various example embodiments of the disclosure, a frequently used application may be preferentially optimized by selecting an application to be optimized based on an application usage pattern of a user and performing application optimization accordingly.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to the accompanying drawings. When describing the example embodiments with reference to the accompanying drawings, like reference numerals refer to like elements and any repeated description related thereto will be omitted.

Figure 1:
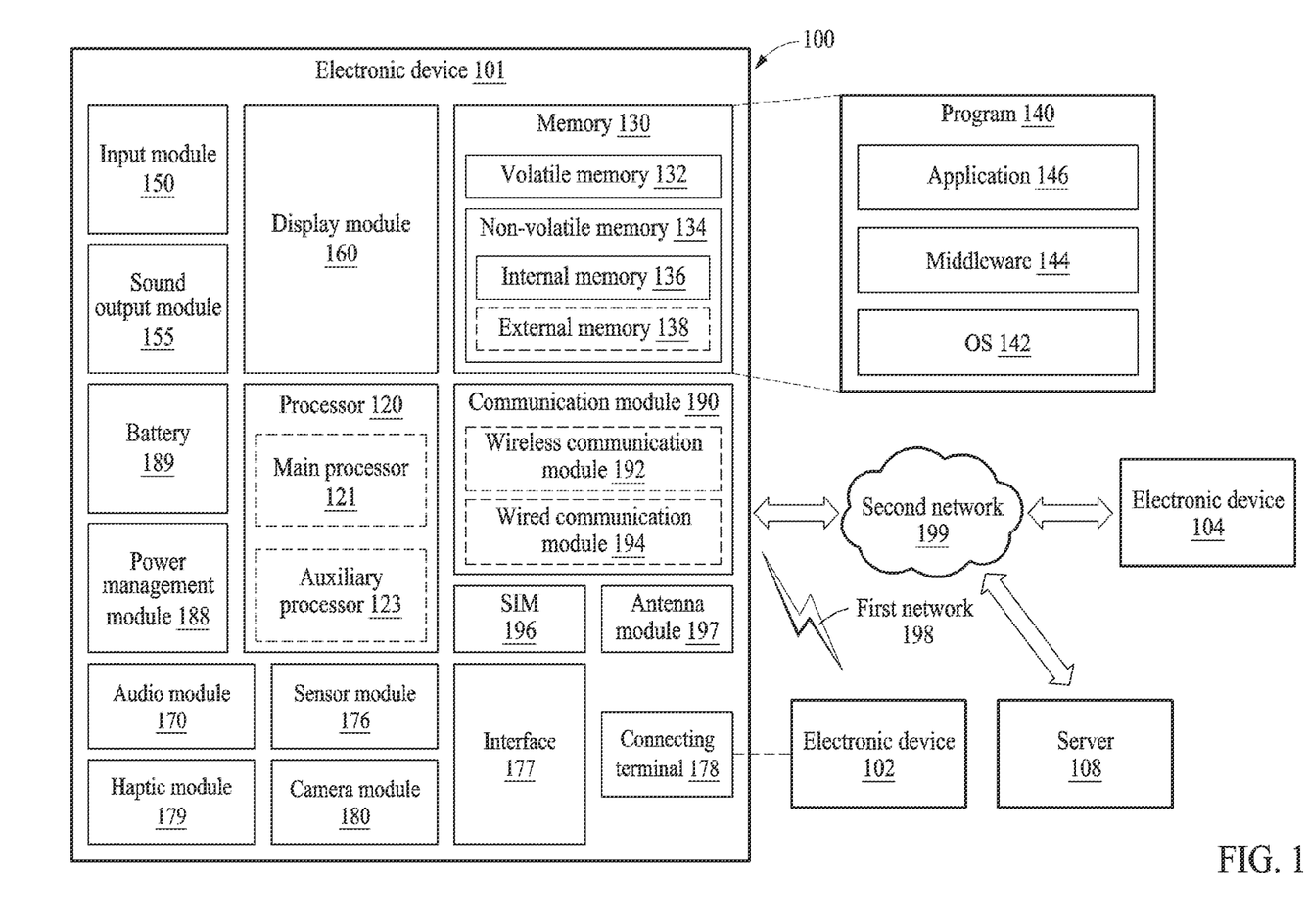
FIG. 1 is a block diagram illustrating an example electronic device in a network environment according to various embodiments.

FIG. 1 is a block diagram illustrating an example electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one of the components (e.g., the connecting terminal 178) may be omitted from the electronic device 101, or one or more other components may be added in the electronic device 101. In various example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be predetermined to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
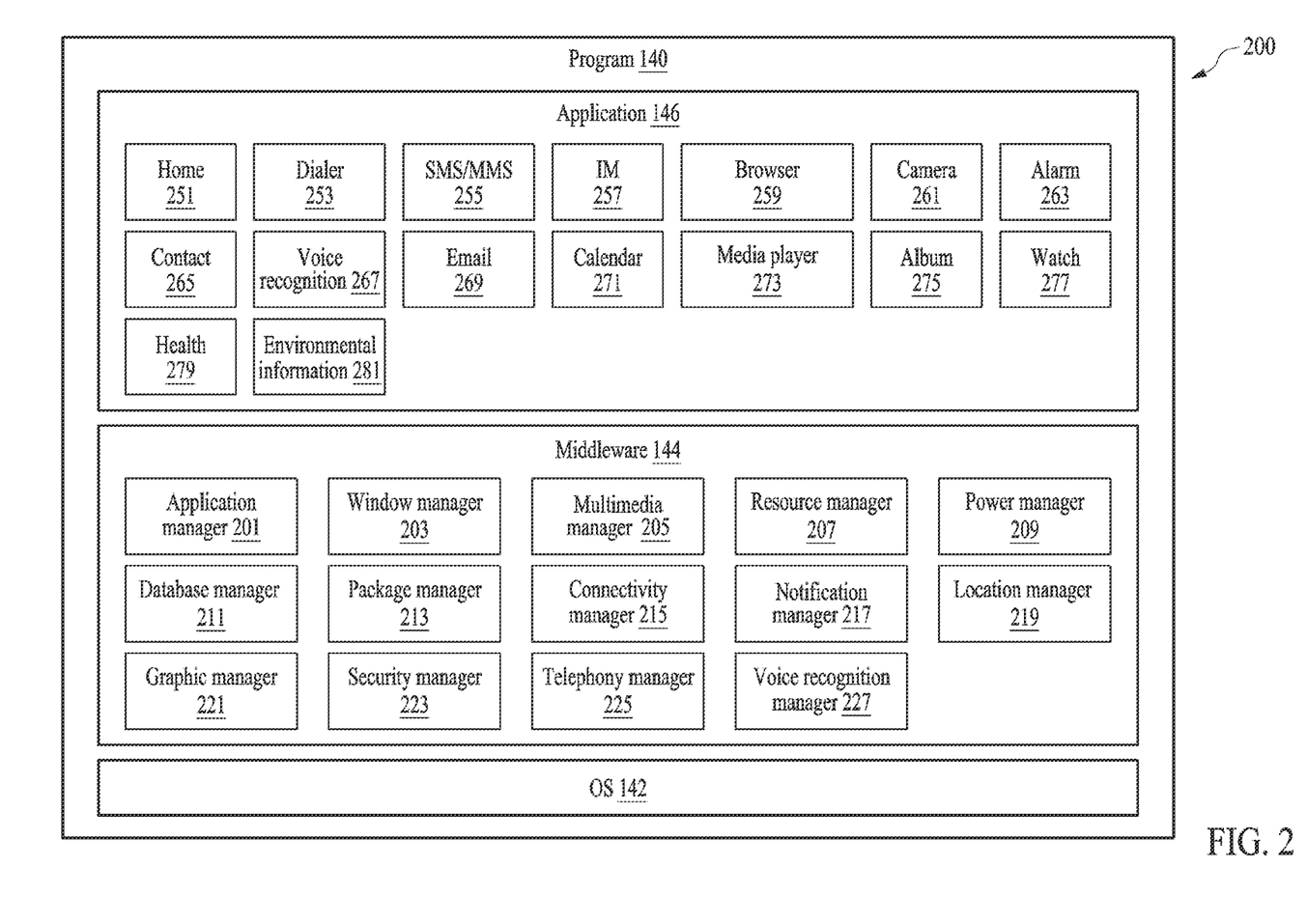
FIG. 2 is a block diagram illustrating an example configuration of a program according to various embodiments.

FIG. 2 is a block diagram 200 illustrating an example configuration of a program 140 according to various embodiments. According to an example embodiment, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include other one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an example embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and may receive, from the server 108, a command corresponding to a function to be executed on the electronic device 101 based at least in part on the voice data, or text data converted based at least in part on the voice data. According to an example embodiment, the middleware 144 may dynamically delete some existing components or add new components. According to an example embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an example embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control a power source (e.g., turning on or off) or a function (e.g., brightness, resolution, or focus) of an external electronic device that communicates with the electronic device 101 or a portion of components of the external electronic device (e.g., a display module or a camera module). The device management application may additionally or alternatively support installation, deletion, or update of an application that operates in an external electronic device.

Figure 3:
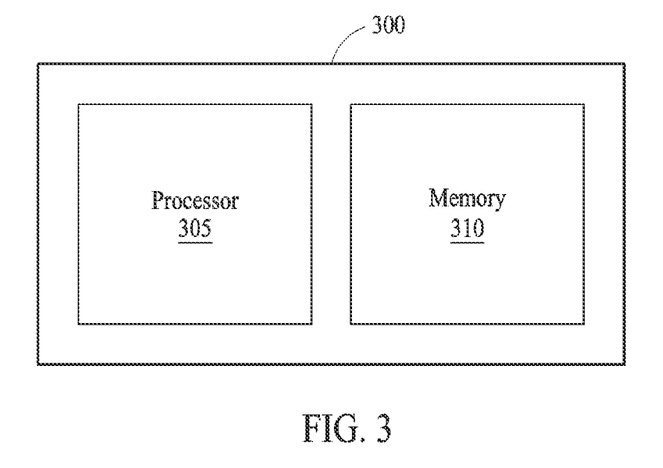
FIG. 3 is a block diagram illustrating an example configuration of an electronic device supporting an application optimization method according to various embodiments.
Figure 4:
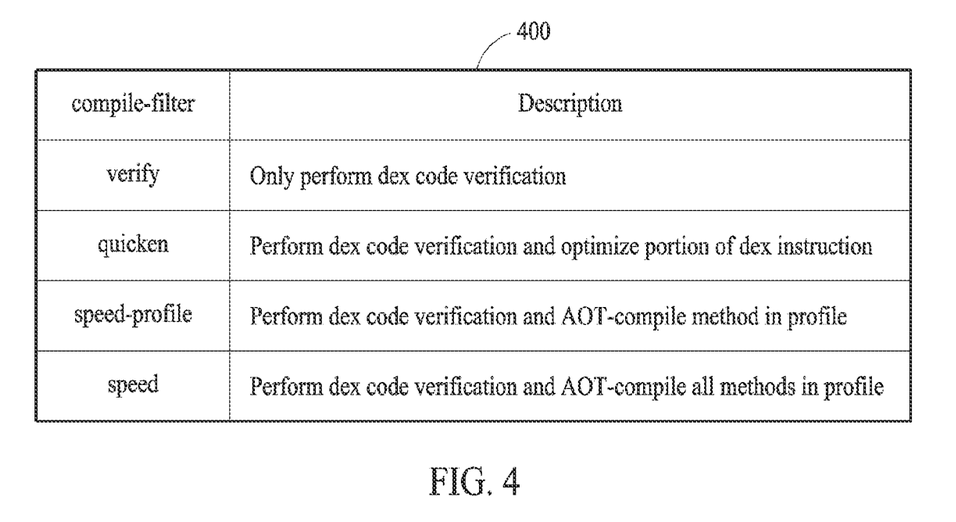
FIG. 4 is a diagram illustrating an example compiler filter of an application according to various embodiments.

FIG. 3 is a block diagram illustrating an example configuration of an example electronic device supporting an application optimization method according to various embodiments, and FIG. 4 is a diagram illustrating an example compiler filter of an application according to various embodiments.

Referring to FIG. 3, an electronic device 300 (e.g., the electronic device 101 of FIG. 1) according to an example embodiment may include a processor (e.g., including processing circuitry) 305 (e.g., the processor 101 of FIG. 1) and a memory 310 (e.g., the memory 130 of FIG. 1), and may support an application optimization method. The memory 310 may store various data used by the processor 305 of the electronic device 300. The various data may include, for example, software (e.g., the program 140 of FIG. 1) and input data or output data for a command related thereto.

A program may be stored as software in the memory 310, and may include, for example, an OS (e.g., the OS 142 of FIG. 1), middleware (e.g., the middleware 144 of FIG. 1) or an application (e.g., the application 146 of FIG. 1).

An application may be configured as a plurality of code for achieving a predetermined purpose, and may be packaged and distributed. When an application is installed in the electronic device 300, code written in programming language may be converted into code for a platform supported by the electronic device 300, and the converted code may be used as a set of instructions to achieve a predetermined purpose.

For example, and without limitation, in the electronic device 300 to which an Android operating system is applied, the processor 305 may compile code of the application to fit a runtime environment and convert the code into native code. As a compiling scheme for the code, for example, and without limitation, an ahead-of-time (AOT) scheme, a just-in-time (JIT) scheme, or a hybrid scheme in which an AOT scheme and a JIT scheme are mixed may be used.

The AOT scheme may compile and convert the code into executable code and store the converted code when the application is installed, and then directly read the executable code that is converted when the application is executed. In the AOT scheme, since the code is converted into executable code when the application is being installed, less time may be required to execute the application, but more time may be required to install the application and more storage space may be required to install the application.

The JIT scheme may be a scheme of compiling only necessary code among code at an appropriate time when an application is executed. In the JIT scheme, when repetitive execution is detected while an interpreter scheme for a loaded class among the code is being performed, a JIT compiler may be appropriately operated to improve execution speed. In the JIT scheme, the executable code may be executed very quickly, and since the memory 310 comprises cache by default, performance may be maximized and/or improved when a class is repeatedly called. However, in the JIT scheme, since the code is compiled into the executable code during runtime, less time may be required to install the application but much more time may be required to execute the application. In addition, when the code cached in the memory 310 is released and re-execution of the code is detected, it may take time for the code to be re-converted, which may cause a delay in an operation of the application.

In the hybrid scheme, when an application is installed, the JIT scheme may be used to shorten the installation time of the application and reduce the installation space of the application. When an AOT daemon is started after a profile according to an application usage pattern of a user is stored through an interpreter, the application is compiled in the background to generate executable code, and when the application is executed, the execution time may be shortened by directly using the executable code.

In the electronic device 300 to which the Android operating system is applied, an execution environment called Android Runtime (hereinafter, ART) may be supported. ART may use the hybrid scheme. In ART, a tool called dex2oat is used to compile a Dalvik executable (.dex) file (a set of code) of an application, wherein an operating scheme may be designated by a set value of a compiler filter 400, and the compiler filter 400 may be set based on a profile according to an application usage pattern of the user. In ART, code of the application may be compiled according to the set compiler filter 400.

Referring to FIG. 3, the processor 305 of the electronic device 300 according to an example embodiment may include various processing circuitry and control at least one other component and may perform various data processing or operations. In the electronic device 300, the AOT daemon and ART may be implemented in a form of a program or instruction stored in the memory 310. An instruction may be executed by the processor 305, and the processor 305 may perform a function corresponding to the instruction.

The processor 305 may compile a .dex file existing in an .apk file, which is a package form of an application, using the dex2oat tool through the AOT daemon. The .dex file compiled through the AOT daemon may be output as an .oat file. A size of the .oat file may be different depending on the compiler filter 400 used during compilation, and performance of the application may also be different.

In the electronic device 300 to which the Android operating system is applied, a firmware update may be performed in a firmware over-the-air (FOTA) scheme. When firmware is updated or a setting value is initialized through a factory reset, the compiler filter 400 of the application may be set to a first option (e.g., verify), and overall performance of the application including execution of the application may decrease. In addition, in the hybrid scheme, since the code of the application can be compiled when a predetermined condition (e.g., a charged state, an idle state, or a state in which a designated time such as once a day has arrived) is satisfied, there is no choice but to wait until the predetermined condition is satisfied to improve the performance of the application.

According to an example embodiment, the processor 305 of the electronic device 300 may select an application to be optimized based on the application usage record of the user, and may compile code of the selected application in the background to perform optimization in application units according to the compiler filter 400 set based on the profile for the selected application.

As shown in FIG. 4, the compiler filter 400 may include an option to compile a .dex file (e.g., application code). For example, when the compiler filter 400 is set to "verify", only code verification of the .dex file may be performed, and when the compiler filter 400 is set to "quicken", code verification of the .dex file may be performed and a portion of .dex instructions may be optimized, and when the compiler filter 400 is set to "speed-profile", code verification of the .dex file may be performed and a method in the profile may be AOT-compiled, and when the compiler filter 400 is set to "speed", code verification of the .dex file may be performed and all methods may be AOT-compiled.

As the compiler filter 400 goes in a downward direction (direction from "verify" to "speed") of the table shown in FIG. 4, a size of an .oat file resulting from compilation may increase, while performance of an application may be improved. As the compiler filter 400 goes in an upward direction (direction from "speed" to "verify") of the table shown in FIG. 4, the size of the .oat file resulting from compilation may decrease, while performance of the application may degrade.

Application optimization in the electronic device 300 may be performed by setting the compiler filter 400 based on a profile according to an application usage pattern and compiling code of the application according to the set compiler filter 400.

In an example embodiment, the processor 305 may generate a list of candidate applications to which a priority is assigned based on an application usage record of a user in order to select an application to perform application optimization, and according to the priority of the list, may determine whether optimization is possible for at least one candidate application.

The processor 305 may determine whether the optimization is possible for the application through ART. In an example embodiment, the processor 305 may determine whether the optimization is possible for the at least one candidate application based on the profile according to the user pattern through ART. The processor 305 may determine whether there is a method to optimize based on the profile of the at least one candidate application, and if there is a method to optimize, determine that the at least one candidate application can be optimized.

Based on a result of the determining, the processor 305 may select a candidate application having a highest priority from among the at least one candidate application that can be optimized as the application for which application optimization is to be performed, and perform the application optimization.

The processor 305 may set the compiler filter 400 for the selected application to a second option (e.g., "speed-profile" or "speed"). The processor 305 may perform the application optimization by compiling an application selected as the application to optimize according to the set compiler filter 400. An optimized application may be generated by performing the application optimization.

According to the electronic device 300 of an example embodiment, even if an idle time of the electronic device 300 is not long enough for optimization to be performed for all applications, the processor 305 may perform the optimization for each application by performing the optimization in application units. According to the electronic device 300 of an example embodiment, a frequently used application may be preferentially optimized by selecting an application to be optimized based on an application usage record of a user.

Hereinafter, an application optimization method performed in an electronic device according to an example embodiment is described in greater detail with reference to FIG. 5.

Figure 5:
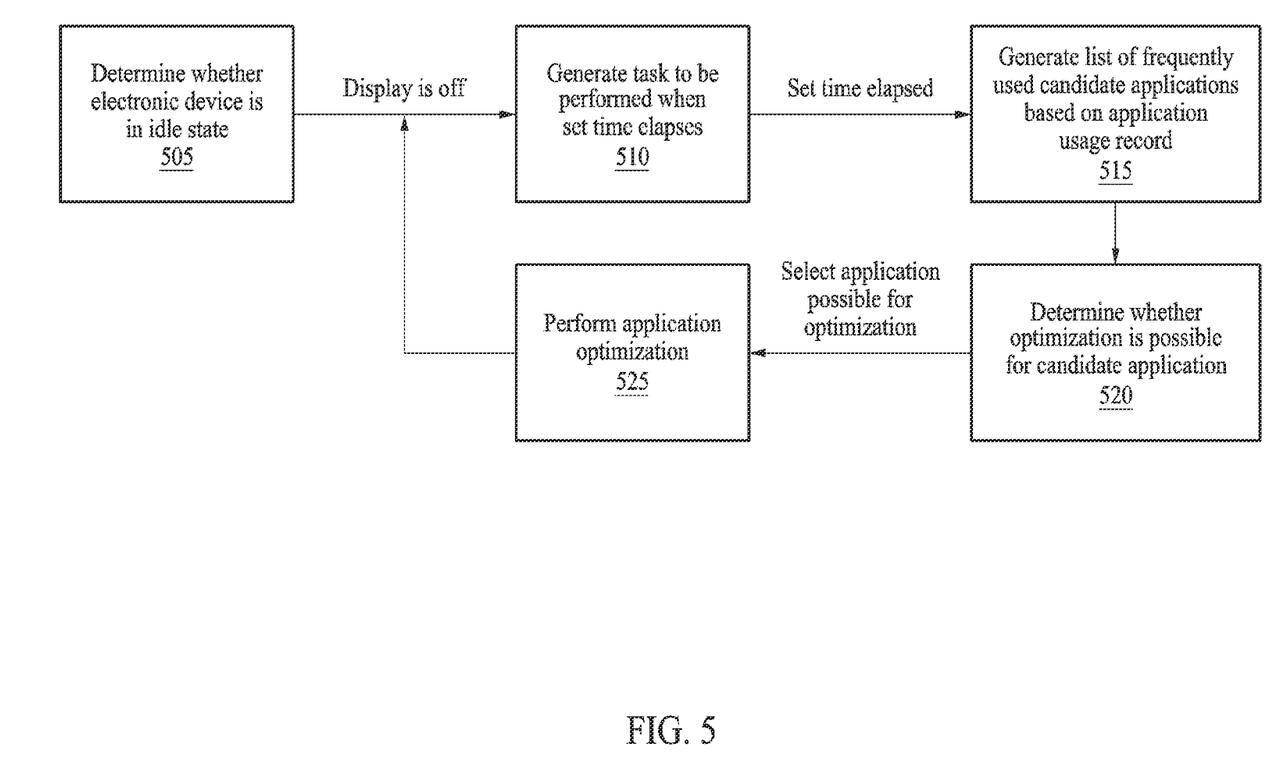
FIG. 5 is a diagram illustrating an example application optimization method according to various embodiments.

FIG. 5 is a diagram illustrating an example application optimization method according to various embodiments.

In the electronic device 300 to which the Android operating system is applied, a firmware update may be performed in a FOTA scheme. When firmware is updated or a setting value is initialized through a factory reset, the compiler filter 400 of an application may be set to a predetermined value (e.g., verify), and overall performance of the application, including execution of the application, may decrease, and application optimization may be needed to increase the performance of the application.

The application optimization may be performed in the background, and may be performed when a state of the electronic device 300 is determined and a set condition is satisfied in order to minimize and/or reduce impact on an operation of the application running in the foreground.

Referring to FIG. 5, in operation 505, the processor 305 of the electronic device 300 may determine whether the state of the electronic device 300 satisfies a set condition in order to minimize and/or reduce impact on an operation of the application running in the foreground. In an example embodiment, when an idle state of the electronic device 300 is maintained for a set time, the processor 305 may determine that the set condition is satisfied.

For example, when a display of the electronic device 300 is turned off, the processor 305 may determine that the electronic device 300 is in the idle state. When the display of the electronic device 300 is turned off, the processor 305 may generate a task to be performed when the set time elapses in operation 510. The task may include operations 510, 515, 520, and 525. However, this is only an example embodiment, and whether an electronic device enters an idle state may be determined regardless of whether the display is on or off, and the set condition may be a condition set with respect to a duration of the idle state.

When the set condition is satisfied, in operation 515, the processor 305 may generate a list of candidate applications for which application optimization may be performed. The list of applications may be newly generated and updated whenever operation 515 is performed. The processor 305 may generate a list of candidate applications to which ranks are assigned in an order of frequency of use during a set period based on an application usage record of a user.

In operation 520, the processor 305 may determine whether application optimization is possible for at least one candidate application among the candidate applications included in the list. The processor 305 may identify whether there is a method to optimize for the corresponding candidate application based on a profile of the at least one candidate application, and determine whether optimization is possible based on the identifying.

The processor 305 may perform the application optimization based on a result of the determining of whether the optimization is possible, and may select a candidate application having a highest priority.

In operation 525, the processor 305 may perform application optimization for the selected application. The application optimization may be performed by setting the compiler filter 400 based on a profile according to an application usage pattern and compiling the code of the application according to the set compiler filter 400.

When the application optimization for the selected candidate application is completed, the processor 305 may determine whether the electronic device 300 is still in the idle state, and if the electronic device 300 is in the idle state, the processor 305 may repeat an operation of generating a task for application optimization, generating a list of candidate applications, and determining whether optimization is possible, to perform the application optimization. The task, for example, may include operations 515, 520, and 525. When operations 510, 515, 520, and 525 are repeated while the electronic device 300 is still in the idle state, operation 515 may be performed without determining whether the set time in operation 510 has elapsed. In an example embodiment, operations 510, 515, 520, and 525 may be performed periodically.

Hereinafter, an application optimization method according to an example embodiment is described in greater detail with reference to FIG. 6.

Figure 6:
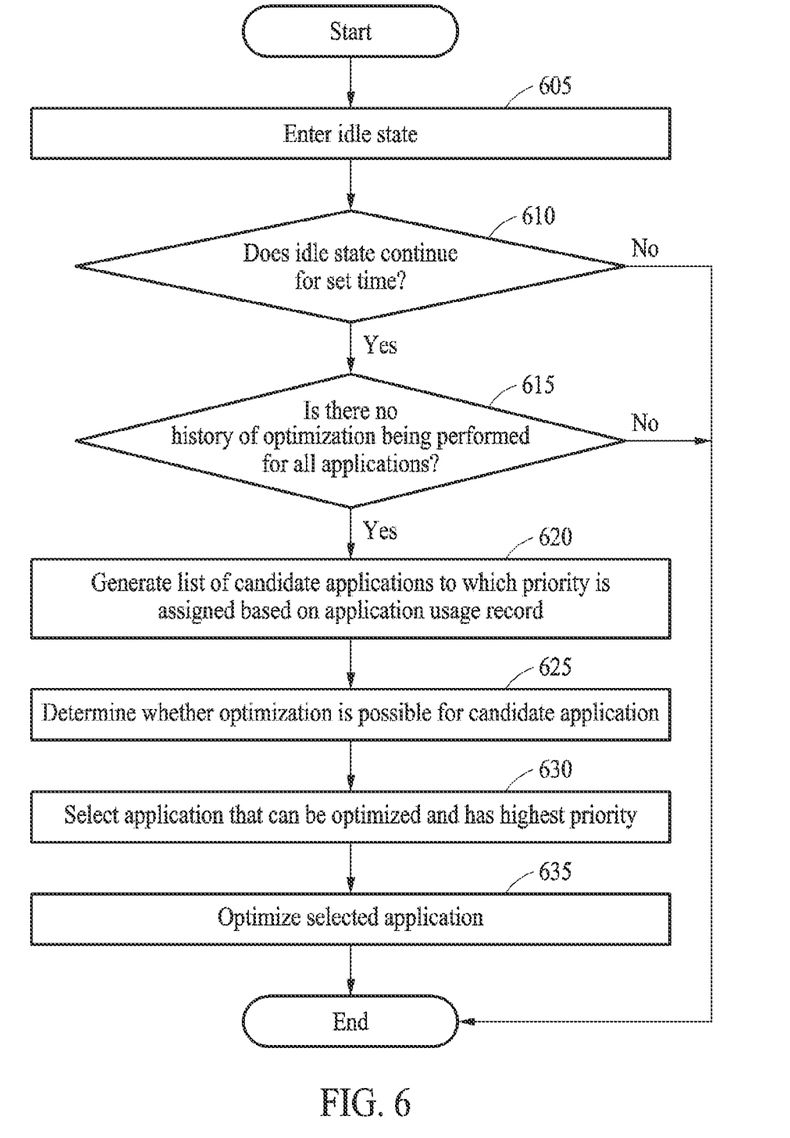
FIG. 6 is a flowchart illustrating an example application optimization method according to various embodiments.

FIG. 6 is a flowchart illustrating an example application optimization method according to various embodiments. In the application optimization method according to an example embodiment, it may be determined whether the electronic device 300 satisfies a set condition, and if the condition is satisfied, application optimization may be performed.

Referring to FIG. 6, the set condition may include conditions for a duration of an idle state of the electronic device 300 and whether there is a history of application optimization being performed for all applications. It may be determined whether the electronic device 300 has entered an idle state such that application optimization may be performed while a user is not using the electronic device 300. If there is a history of application optimization being performed for all applications, it may not be necessary to perform the application optimization again. A condition with respect to the history of optimization performed may be determined to verify whether it is necessary to perform the application optimization.

In operation 605, the electronic device 300 may enter the idle state. According to an example embodiment, in operation 610, the processor 305 of the electronic device 300 may determine whether the idle state of the electronic device 300 continues for a set time as one of the set conditions. In operation 605, if the user uses the electronic device 300 again after the electronic device 300 enters the idle state, the idle state may not be maintained for the set time. In such case, if application optimization is performed, performance of the electronic device 300 may be affected, so the processor 305 may not perform application optimization to prevent and/or reduce the performance of the electronic device 300 from being affected.

According to an example embodiment, in operation 615, the processor 305 of the electronic device 300 may verify whether there is no history of optimization being performed for all applications, as another one of the set conditions.

When there is a history of optimization being performed for all applications after firmware is updated using FOTA or after the electronic device 300 is initialized, the processor 305 may not perform application optimization because optimization of all applications has already been completed.

When the idle state of the electronic device 300 continues for the set time and optimization of all applications is not performed after firmware is updated through FOTA or after the electronic device 300 is initialized, in operation 620, the processor 305 may generate a list of candidate applications to which a priority is assigned based on an application usage record.

In an example embodiment, the priority assigned to the candidate applications may be assigned based on the application usage time for the set period, and the longer the usage time for the set period is, the higher the assigned priority may be. However, this is only an example embodiment, and a priority may be assigned according to other criteria based on usage records. For example, the higher a frequency of use of the application is during the set period, the higher the assigned priority may be.

In operation 625, the processor 305 may determine whether optimization is possible for at least one candidate application in the list. The processor 305 may determine whether the optimization of the at least one candidate application is possible based on a profile of the corresponding application. This will be described with reference to FIG. 7 below.

In operation 630, the processor 305 may select an application that can be optimized and has a highest priority from among the candidate applications. In operation 635, the processor 305 may perform application optimization in the background for the selected application.

Hereinafter, operations 625 and 630 are described in greater detail with reference to FIG. 7.

Figure 7:
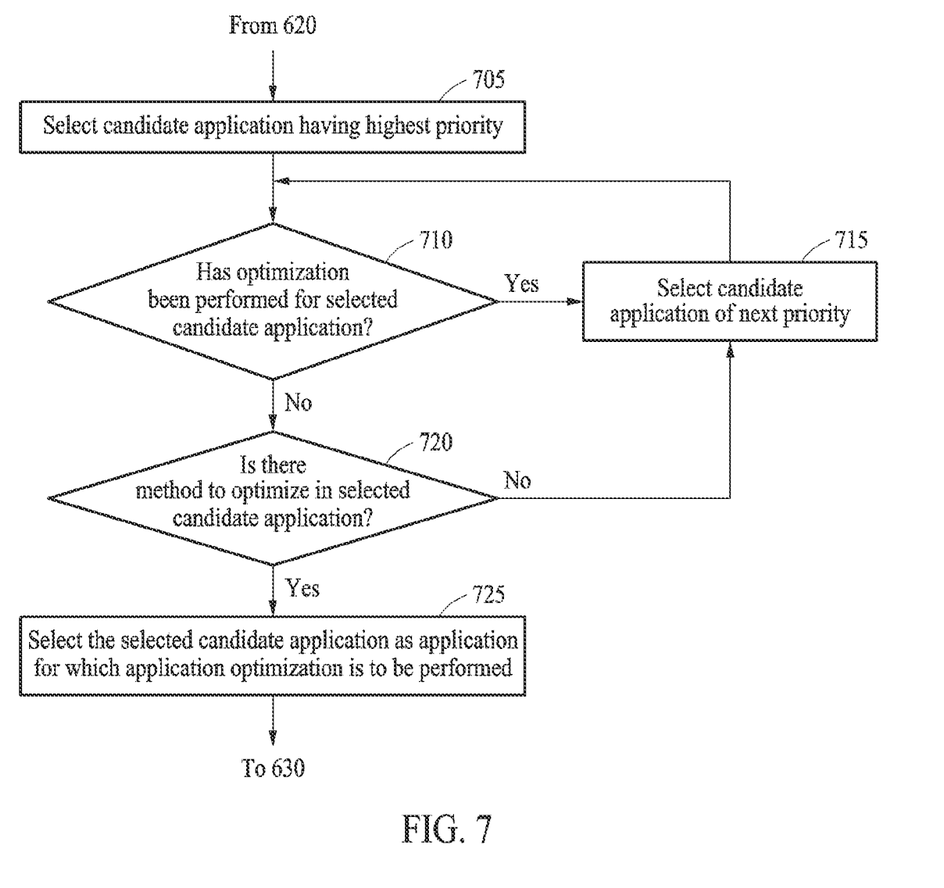
FIG. 7 is a flowchart illustrating an example operation of selecting an application for which application optimization is to be performed in an application optimization method according to various embodiments.

FIG. 7 is a flowchart illustrating an example operation of selecting an application for which application optimization is to be performed in an application optimization method according to various embodiments.

Referring to FIG. 7, the processor 305 of the electronic device 300 according to an example embodiment may determine whether optimization is possible for at least one candidate application in order to select an application for which application optimization is to be performed from among candidate applications.

In operation 705, the processor 305 may select a candidate application having a highest priority from a list of candidate applications generated in operation 620. In operation 710, the processor 305 may verify whether the application optimization is performed for the selected candidate application after an update using FOTA. Whether the application optimization has been performed for the candidate application may be verified through the compiler filter 400 for the candidate application. When the application optimization has not been performed, the compiler filter 400 may be initialized and set to a first option (e.g., verify) when firmware is updated, and when the application optimization has been performed, the compiler filter 400 may be changed and set to a second option (e.g., "speed-profile" or "speed"). When the compiler filter 400 is set to the first option, the processor 305 may determine that the application optimization has not been performed, and when the compiler filter 400 is set to the second option, may determine that the application optimization has been performed.

When it is determined that the selected candidate application has been optimized in operation 710, the processor 305 may select a candidate application of a next priority from the list in operation 715, and determine whether the application has been optimized in operation 710 again.

When it is determined that application optimization has not been performed for the selected candidate application in operation 710, the processor 305 may determine whether there is a method to optimize based on a profile of the selected candidate application in operation 720. The profile may include index information on frequently called methods, and the processor 305 may determine that there is a method to optimize when there are methods included in the profile.

When it is determined in operation 720 that there is no method to optimize in the candidate application, the processor 305 may select a candidate application of a next priority in operation 715, and perform operations 710 and 720.

When it is determined in operation 720 that there is a method to optimize in the candidate application, the processor 305 may select the corresponding candidate application as an application for which application optimization is to be performed in operation 725.

The processor 305 may perform application optimization in operation 635 for the application selected in operation 725. The processor 305 may perform the application optimization by AOT-compiling methods included in the profile of the selected application. In this case, the processor 305 may set the compiler filter 400 for the selected application to the second option (e.g., "speed-profile" or "speed") and perform AOT compilation. The processor 305 may generate an optimized application through the AOT compilation. The optimized application may have higher performance than that of an application compiled according to the first option (e.g., "verify").

When the application optimization is performed for all applications, the application optimization method according to an example embodiment may not be performed any more. When the electronic device is initialized or a firmware update is performed through FOTA after the application optimization is performed for all applications, the application optimization method according to an example embodiment may be performed again.

Since the application optimization method according to an example embodiment may be repeated in application units, even if the idle time of the electronic device 300 is not long enough for optimization to be performed on all applications, it may be guaranteed that the application optimization may be performed at least one application. According to the electronic device 300 of an example embodiment, an application to be optimized may be selected based on an application usage record of a user to preferentially optimize a frequently used application, and thereby increase user-sensible performance of the electronic device 300.

In another example embodiment, the processor 305 may predict a duration of an idle state of the electronic device based on a usage record of the electronic device. For example, the usage record of the electronic device may include information such as a time the user turns on/off a display of the electronic device and an application that the user has executed. The processor 305 may predict the duration of the idle state of the electronic device based on statistics on the usage record or may predict the duration of the idle state of the electronic device through machine learning of the usage record.

The processor 305 may estimate a time required to generate an optimized application by performing application optimization on the application selected in operation 630. The required time may be estimated, for example, based on the number of methods included in the profile.

The processor 305 may perform operation 635 when the required time that is estimated is longer than a time for which the electronic device is expected to remain in the idle state.

Hereinafter, a method of minimizing and/or reducing inconvenience to the user when the electronic device 300 leaves the idle state while application optimization is being performed is described in greater detail with reference to FIG. 8.

Figure 8:
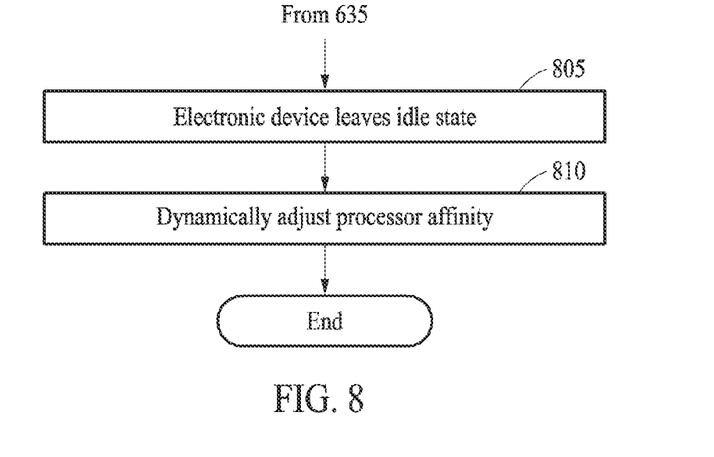
FIG. 8 is a flowchart illustrating an example operation of adjusting processor affinity when an electronic device leaves an idle state while application optimization is being performed, according to various embodiments.

FIG. 8 is a flowchart illustrating an example operation of adjusting processor affinity when an electronic device leaves an idle state while application optimization is being performed, according to various embodiments.

According to an application optimization method of an example embodiment, the electronic device 300 may leave the idle state while operations 605 to 635 are being performed. For example, the user may turn on a display of the electronic device 300 to execute an application in the foreground.

When the electronic device 300 leaves the idle state while operations 605 to 630 are being performed, the processor 305 of the electronic device 300 according to an example embodiment may suspend the corresponding operation to prevent and/or reduce performance degradation of the application being executed in the foreground.

In operation 805, the electronic device 300 may leave the idle state while an application optimization in operation 635 is being performed. Since the application optimization in operation 635 may include an AOT compilation operation, if application optimization is stopped mid-operation, an error may occur when the application is executed later.

When the electronic device 300 leaves the idle state while the application optimization is being performed in operation 635, the processor 305 may adjust processor affinity for an application optimization operation in operation 810 to minimize and/or reduce impact on the performance of the application being executed in the foreground. The processor 305 may dynamically adjust the processor affinity for the application optimization operation according to whether the electronic device 300 is in the idle state while the application optimization is being performed.

For example, the processor 305 may include a high-performance core processor with relatively high power consumption and a low-performance core processor with relatively low power consumption. When the electronic device 300 leaves the idle state while the application optimization is being performed, the processor 305 may adjust the processor affinity so that the application optimization operation is performed by the low-performance core processor. When the electronic device 300 enters the idle state again, the processor 305 may adjust the processor affinity so that the application optimization operation is performed by the high-performance core processor.

According to an example embodiment, an application optimization method may include: determining whether a condition set with respect to a duration of an idle state of an electronic device is satisfied, selecting an application for which application optimization is to be performed based on an application usage record of a user of the electronic device based on the set condition being satisfied, and generating an optimized application by performing the application optimization in the background for the selected application.

The selecting may include, generating a list of candidate applications to which a priority is assigned based on the application usage record of a user based on the set condition being satisfied, determining whether optimization is possible for at least one candidate application in the list based on the priority, and based on a result of the determining, selecting a candidate application having a highest priority from among the at least one candidate application that can be optimized as the application for which the application optimization is to be performed.

The generating of the list may include generating a list of candidate applications to which the priority is assigned based on a usage time of applications for a set period.

The determining of whether the optimization is possible may include verifying whether the at least one candidate application is optimized, determining whether there is a method to be optimized in the at least one candidate application based on the at least one candidate application not being optimized, and determining that the at least one candidate application can be optimized based on there being a method to be optimized.

Based on the idle state of the electronic device being maintained for a set time, the set condition may be satisfied.

Based on the idle state of the electronic device being maintained for the set time and there being no history of application optimization being performed for all applications of the electronic device, the set condition may be satisfied.

According to an example embodiment, the application optimization method may include: dynamically adjusting processor affinity of the electronic device based on the electronic device leaving the idle state while the generating of the optimized application is being performed.

Based on optimization being completed for all applications that can be optimized, the method may be performed again after a firmware update of the electronic device.

According to an example embodiment, the application optimization method may further include: predicting a duration of the idle state based on the usage record of the electronic device, and estimating a time required to generate the optimized application, wherein the generating of the optimized application may be performed based on the predicted time being longer than the estimated time.

The determining, the selecting, and the generating may be performed periodically.

The generating may include setting a compiler filter and compiling the method to be optimized based on the set compiler filter.

According to an example embodiment, an electronic device configured to support an application optimization method may include at least one processor, and at least one memory storing instructions and an application to be executed by the processor, wherein based on the instructions being executed by the processor, the processor 305 may be configured to: determine whether a condition set with respect to a duration of an idle state of the electronic device is satisfied, select an application to perform optimization based on an application usage record of the electronic device based on the set condition being satisfied, and generate an optimized application by performing the application optimization in the background for the selected application.

The selecting may include, generating a list of candidate applications to which a priority is assigned based on the application usage record based on the set condition being satisfied, determining whether optimization is possible for at least one candidate application in the list based on the priority, and based on a result of the determining, selecting a candidate application having a highest priority from among the at least one candidate application that can be optimized as the application for which the application optimization is to be performed.

The generating of the list may include generating a list of candidate applications to which the priority is assigned based on a usage time of applications for a set period.

The determining of whether the optimization is possible may include verifying whether the at least one candidate application is optimized, determining whether there is a method to be optimized in the at least one candidate application based on the at least one candidate application not being optimized, and determining that the at least one candidate application can be optimized based on there being a method to be optimized.

Based on the idle state of the electronic device being maintained for a set time, the set condition may be satisfied.

Based on the idle state of the electronic device being maintained for the set time and there being no history of application optimization being performed for all applications of the electronic device, the set condition may be satisfied.

Based on the instructions being executed by the processor, the processor may be further configured to: dynamically adjust processor affinity of the electronic device based on the electronic device leaving the idle state while the generating of the optimized application is being performed.

Based on the instructions being executed by the processor, the processor may be further configured to: predict the duration of the idle state based on the usage record of the electronic device, and estimate a time required to generate the optimized application, wherein the generating of the optimized application may be performed based on the predicted time being longer than the estimated time.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-predetermined integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An application optimization method of an electronic device, the method comprising:
   determining whether a condition that is set with respect to a duration of an idle state of the electronic device is satisfied;
   selecting an application for which application optimization is to be performed based on an application usage record of the electronic device, in response to the condition being satisfied; and
   generating an optimized application by performing the application optimization in a background for the selected application,
   wherein the selecting comprises:
   assigning a priority to each of candidate applications based on the application usage record, in response to the condition being satisfied; and
   selecting a candidate application having a highest priority from among the candidate applications as the application for which the application optimization is to be performed.

2. The method of claim 1, wherein the selecting comprises:
   generating a list of the candidate applications to which the priority is assigned based on the application usage record;
   determining whether optimization is possible for at least one candidate application in the list based on the priority; and
   based on a result of the determination of whether the optimization is possible, selecting the candidate application having the highest priority as the application for which the application optimization is to be performed.

3. The method of claim 2, wherein the generating of the list comprises creating the list of the candidate applications to which the priority is assigned based on a usage time of applications for a set period.

4. The method of claim 2, wherein the determining of whether the optimization is possible comprises:
   verifying whether the at least one candidate application is optimized;
   determining whether there is a method to be optimized in the at least one candidate application, in response to the at least one candidate application not being optimized; and
   determining that the optimization is possible for the at least one candidate application, in response to there being the method to be optimized.

5. The method of claim 1, wherein the condition is satisfied in response to the idle state of the electronic device being maintained for a set time.

6. The method of claim 1, wherein the condition is satisfied in response to the idle state of the electronic device being maintained for a set time and there being no history of application optimization being performed for all applications of the electronic device.

7. The method of claim 1, further comprising:
dynamically adjusting processor affinity of the electronic device, in response to the electronic device leaving the idle state while the optimized application is being generated.

8. The method of claim 1, wherein the method is performed again after a firmware update of the electronic device, in response to optimization being completed for all applications that can be optimized.

9. The method of claim 5, further comprising:
predicting a duration of the idle state based on the usage record of the electronic device; and
estimating a time required to generate the optimized application, and
wherein the generating of the optimized application is performed in response to the predicted duration being longer than the estimated time.

10. The method of claim 1, wherein the determining, the selecting, and the generating are performed periodically.

11. The method of claim 4, wherein the generating comprises:
setting a compiler filter; and
compiling the method to be optimized based on the set compiler filter.

12. A non-transitory computer-readable storage medium having stored thereon instructions that, when executed by a processor, cause the processor to perform the operations of claim 1.

13. An electronic device, comprising:
at least one processor; and
memory for storing instructions that, when executed by the at least one processor individually or collectively, cause the electronic device to:
determine whether a condition that is set with respect to a duration of an idle state of the electronic device is satisfied;
select an application for which application optimization is to be performed based on an application usage record of the electronic device, in response to the condition being satisfied; and
generate an optimized application by performing the application optimization in a background for the selected application,
wherein the instructions that, when executed by the at least one processor individually or collectively, cause the electronic device to:
assign a priority to each of candidate applications based on the application usage record, in response to the condition being satisfied; and
select a candidate application having a highest priority from among the candidate applications as the application for which the application optimization is to be performed.

14. The electronic device of claim 13, wherein the instructions that, when executed by the at least one processor, cause the electronic device to:
generate a list of the candidate applications to which the priority is assigned based on the application usage record;
determine whether optimization is possible for at least one candidate application in the list based on the priority; and
based on a result of the determination of whether the optimization is possible, select the candidate application having the highest priority from among the at least one candidate application that can be optimized as the application for which the application optimization is to be performed.

15. The electronic device of claim 14, wherein the instructions that, when executed by the at least one processor, cause the electronic device to:
create the list of the candidate applications to which the priority is assigned based on a usage time of applications for a set period.

16. The electronic device of claim 14, wherein the instructions that, when executed by the at least one processor, cause the electronic device to:
verify whether the at least one candidate application is optimized;
determine whether there is a method to be optimized in the at least one candidate application, in response to the at least one candidate application not being optimized; and
determine that the at least one candidate application can be optimized, in response to there being the method to be optimized.

17. The electronic device of claim 13, wherein the condition is satisfied in response to the idle state of the electronic device being maintained for a set time.

18. The electronic device of claim 13, wherein the condition is satisfied in response to the idle state of the electronic device being maintained for a set time and there being no history of application optimization being performed for all applications of the electronic device.

19. The electronic device of claim 13, wherein the instructions that, when executed by the at least one processor, cause the electronic device to:
dynamically adjust processor affinity of the electronic device, in response to the electronic device leaving the idle state while the optimized application is being generated.

20. An electronic device, comprising:
at least one processor; and
memory for storing instructions that, when executed by the at least one processor individually or collectively, cause the electronic device to:
determine whether a condition that is set with respect to a duration of an idle state of the electronic device is satisfied;
select an application for which application optimization is to be performed based on an application usage record of the electronic device, in response to the condition being satisfied; and
generate an optimized application by performing the application optimization in a background for the selected application,
wherein the condition set is satisfied in response to the idle state of the electronic device being maintained for a set time,
wherein the instructions that, when executed by the at least one processor individually or collectively, further cause the electronic device to:
predict a duration of the idle state based on the usage record of the electronic device; and
estimate a time required to generate the optimized application, and
wherein generation of the optimized application is performed in response to the predicted duration being longer than the estimated time.

* * * * *